Patented Apr. 23, 1929.

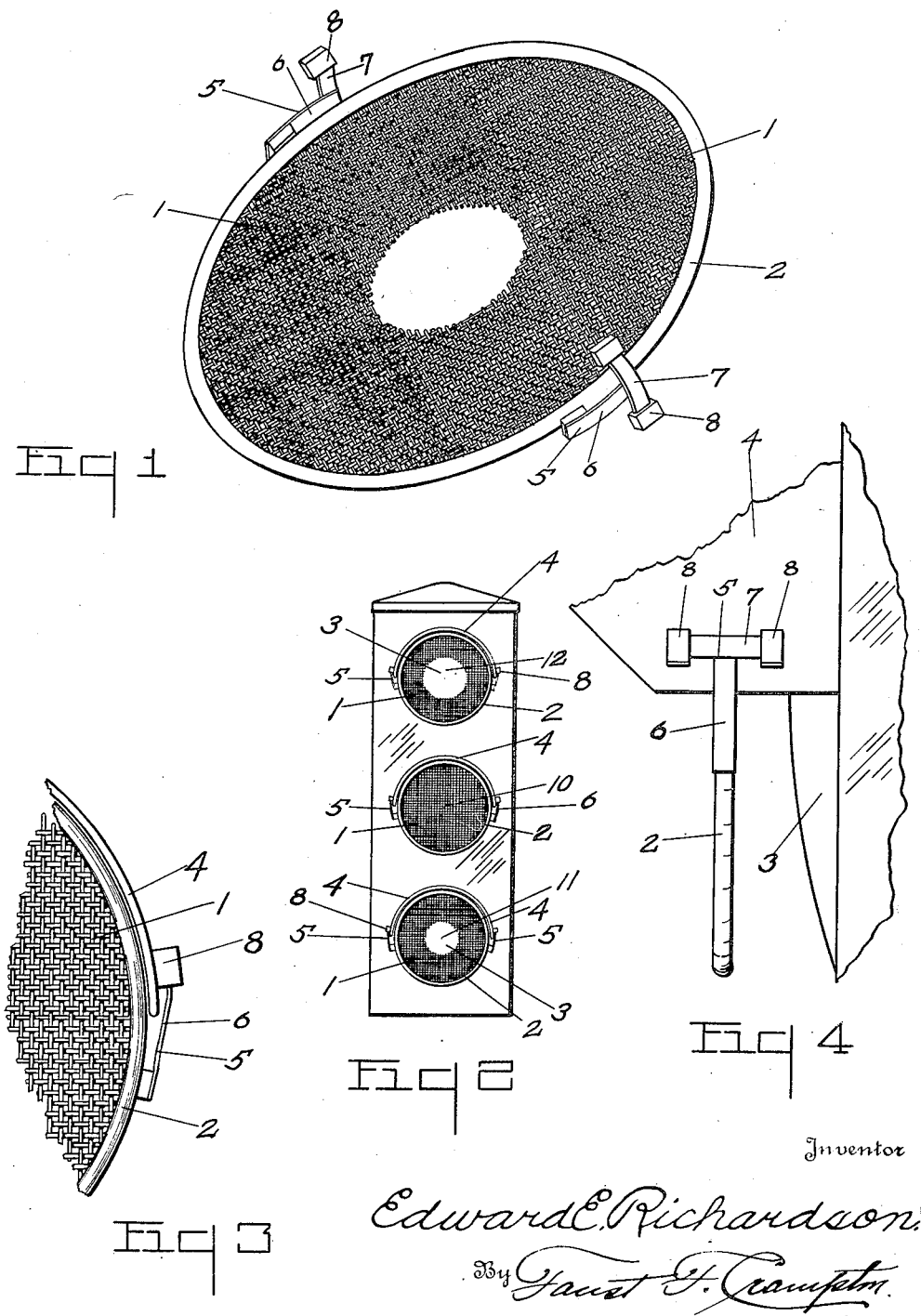

1,709,951

UNITED STATES PATENT OFFICE.

EDWARD E. RICHARDSON, OF MAUMEE, OHIO.

LIGHT SCREEN.

Application filed November 19, 1927. Serial No. 234,431.

My invention has for its object to provide a means for preventing light from an external source producing colored signal lights in connection with any form of a light indicator to enable correct interpretation of the signals and prevent confusion or uncertainty as to the signal intended to be given. The invention particularly has for its object to provide a means for preventing the characteristic lighting of signalling devices by the reflected sunlight, particularly when the sun is located at a low angle, which ordinarily produces confusion as to the indication intended by the operation of the signalling device.

The invention may be contained in signalling devices of different forms that are dependent upon the transmission of light through translucent material, or a material or materials of distinctive color or colors, and, to illustrate a practical application of my invention, I have selected a structure containing the invention as an example of such structures and shall describe it hereinafter. The structure selected is shown in the accompanying drawings.

Fig. 1 is a perspective view of the particular example selected for purposes of illustration to show a light screen embodying my invention. Fig. 2 illustrates a signalling device of the type commonly used in connection with traffic signals, it being provided with a plurality of indicating elements to direct the traffic and to which my invention is shown applied. Fig. 3 is an enlarged view of one side portion of the light screen, and illustrates the manner in which the device may be secured in position. Fig. 4 is a side view of a part of the device and illustrates the displaced relation of the device with respect to a lens of the signalling device.

The device embodying my invention comprises a translucent means which is preferably so formed as to cause a diffusion of a large part of the light that passes through the device. Thus the device provides a means for causing diffusion of the rays of light that may be directed into the lamp of the signalling device from a source exterior to the lamp which prevents the uniform reflection of the rays of light by the reflector of the device that ordinarily would produce substantially the same effect that is produced by the lighting of the bulb of the signalling device. Where the sun shines directly into a device, as where the sun is near the plane of the horizon, the reflection of the rays of light of the sun from the reflector of the lamp produces substantially the same signal as would be produced by the lighting of the bulb of the lamp and, by breaking up or reducing the intensity of the sunlight, the effect is so diminished that the lighting of the bulb will produce the desired variation in intensity of the characteristic light that the signal will be transmitted or there will be such a marked change in the intensity of the characteristically colored light that the signal will be received and may be responded to by those observing the signal. Thus, by my invention I have provided a means for reducing the intensity of the rays of the sunlight to enable the light of the signalling element to produce the desired indications.

In the particular form of construction shown in the drawings, the translucent material or the substantially translucent member is made in the form of a wire screen that may be located in front of the lens of the signalling device. The wire screen 1 may be provided with a suitable reinforcing rim 2 that may be mounted in front of a lens 3. Where there are a plurality of signalling devices having a plurality of lenses, a screen is located preferably in front of each of the lenses. In the form of construction shown, the signalling devices are each provided with a visor, such as the visor 4 and suitable engaging members 5 are connected to each side of the rim 2 and in position to engage the sides of the visor 4. The engaging member may consist of a spring bar 6, which is secured to the rim 2, and a cross bar 7, that may also be formed of elastic material, is connected to the end of the bar 6. At the ends of the bar 7 are located a pair of engaging members, such as frictionally engaging compressible members, such as rubber blocks 8, which will frictionally engage the edge of the visor 4 and hold the screen 1 in position.

The screen 1 is preferably located in slightly spaced relation with respect to the front of the lens 3 in order to prevent the light reflected from the front of the lens from passing out through the same openings in the screen to the eye of the individual who may be observing the signal, where the angle of the incident and reflected light is very small. That is, it causes a large portion of the reflected rays, as well as the incident rays, to be intercepted by the wires of the screen.

Furthermore, I have found that it is desirable to vary the quantity of light that may be permitted to enter the signalling device from an external source, such as from the sun, in order that the maximum amount of characteristically colored light may be produced when the bulb of the signalling device is lighted. Thus, I have found that, where an amber lens is used, a large portion of the rays of light from the external source should be cut off owing to the fact that the amber glass transmits practically all of the light from the bulb and also transmits the larger portion of the light from the sun. In the construction embodying my invention, where an amber colored glass is used in the open and subject to the sunlight when the sun is at a low angle, the entire lens is preferably covered by the light screen 10 to eliminate a large portion of the reflected light from the sun that may strike the reflector of the signalling device, the amber colored glass operating to transmit substantially all of the light of the light bulb, will produce a sufficient distinctive signal to be observed.

Where the lens is formed of red glass, there is a lesser transmission of the sun's rays to the reflector of the signalling device and also a lesser transmission of the rays from the bulb, and, consequently, it is preferable to provide for an increase of the rays of light from the bulb. Thus, the area of the lens covered by the screen may be decreased, to provide for this variation of the proportionate amount of the light that is transmitted from the two sources. Also it has been observed that the bulb, which is invariably located at the center of the reflector, causes the sunlight to be reflected from the surface of the glass of the bulb to the peripheral portions of the reflector and does not reflect directly back to the center of the lens. On the other hand, the light from the bulb will be transmitted through the top of the bulb and through the center of the lens, which will produce a marked change in the light at the center of the lens when the bulb is lighted. Hence, I find it preferable to form the opening 11 in the center of the screen.

Where the signalling device is provided with a green lens, a still lesser quantity of light is transmitted through the lens either from the sun or from the bulb and, consequently, the desired distinction is produced upon the lighting of the bulb if the transparency of the screen embodying my invention is increased or the area covered by the screen is decreased to permit more light to be transferred to and from the signalling device. Thus, the wire screen, where it is used in connection with a green lens, may be provided with a central opening 12 that is larger than the one that is used where the lens is red. Thus, by my invention, the translucency and the characteristic quality of the construction embodying my invention may be varied to produce the most efficient results according to the translucency or color of the transparent element that is used to cover the bulb and reflector of the signalling device. My invention thus provides a means for obviating the confused condition created by the reflection of a light from a source external to the signalling device.

I claim:

1. In a light screen for signaling devices having a light bulb, a reflector and a colored lens, a reticulated screen covering substantially that portion of the lens other than that opposite to the light bulb to permit direct light to pass from the light bulb through the portion of the lens not covered by the screen, the light from a source outside of the signaling device being deflected by the light bulb and by the screen the relation between the light transmitting properties of the lens and the size of the central opening in the screen being such as to prevent a phantom indication.

2. In a light screen for associated signaling devices each having a light bulb, a reflector, and a colored lens, a reticulated screen covering substantially that portion of each lens other than that opposite to the light bulb for diffusing the rays of light from a source external to the signaling device to permit direct light to pass from the light bulbs through the portions of the lenses not covered by the screens, the light from an external source passing into the casing through the portion of the lenses not covered by the screens being deflected by the light bulbs, the areas of the portions of the lenses not covered by the screens varying inversely in area according to the light transmitting properties of the lenses.

In witness whereof I have hereunto signed my name to this specification.

EDWARD E. RICHARDSON.